United States Patent
Guo et al.

(10) Patent No.: US 12,524,330 B1
(45) Date of Patent: Jan. 13, 2026

(54) INTELLIGENT TESTING METHOD FOR AUTONOMOUS DRIVING BASED ON INTERACTION OF MULTIPLE BACKGROUND TRAFFIC PARTICIPANTS

(71) Applicant: Tongji University, Shanghai (CN)

(72) Inventors: Lulu Guo, Shanghai (CN); Mengge Sun, Shanghai (CN); Hong Chen, Shanghai (CN)

(73) Assignee: Tongji University, Shanghai (CN)

( * ) Notice: Subject to any disclaimer, the term of this patent is extended or adjusted under 35 U.S.C. 154(b) by 0 days.

(21) Appl. No.: 19/181,384

(22) Filed: Apr. 17, 2025

(51) Int. Cl.
  *G06F 11/3668* (2025.01)
  *B60W 60/00* (2020.01)
  *G06F 11/34* (2006.01)

(52) U.S. Cl.
  CPC ....... *G06F 11/3668* (2013.01); *B60W 60/001* (2020.02); *G06F 11/3409* (2013.01)

(58) Field of Classification Search
  CPC .................................................. G06F 11/3668
  See application file for complete search history.

(56) References Cited

U.S. PATENT DOCUMENTS

2023/0150530 A1* 5/2023 Chiu ................. G06V 20/56
  701/23

FOREIGN PATENT DOCUMENTS

CN 115129050 A * 9/2022 .......... G05D 1/0214
WO WO-2023217868 A1 * 11/2023 ............. G06Q 10/04

* cited by examiner

Primary Examiner — Jae U Jeon
(74) Attorney, Agent, or Firm — Bayramoglu Law Offices LLC

(57) ABSTRACT

An intelligent testing method for autonomous driving based on interaction of multiple background traffic participants, which includes the following steps: obtaining a test scenario and path information of traffic interactors in the test scenario, wherein the traffic interactors include a vehicle under test and background traffic participants, and the background traffic participants include background vehicles and background pedestrians; constructing a kinematic model of the background traffic participants based on the path information; dynamically constructing safety constraints between any two traffic interactors based on the path information; controlling the background traffic participants to conflict with the vehicle under test based on the kinematic model and the safety constraint, and constructing model prediction control to obtain a reference speed of the background traffic participants under collaborative interaction; and collecting real driving data of the vehicle under test and the background traffic participants in real time.

10 Claims, 3 Drawing Sheets

INTELLIGENT TESTING METHOD FOR AUTONOMOUS DRIVING BASED ON INTERACTION OF MULTIPLE BACKGROUND TRAFFIC PARTICIPANTS

TECHNICAL FIELD

The present invention relates to the field of autonomous driving technology, and in particular, to an intelligent testing method for autonomous driving based on interaction of multiple background traffic participants.

BACKGROUND

With the development of connected and autonomous vehicle technology, vehicles may exchange information and coordinate with each other to achieve multi-vehicle collaborative control. Through autonomous driving based on vehicle-road collaboration, it is impossible to expand the perception range, improve the perception ability, and achieve the group intelligence. Comprehensive testing of autonomous vehicles is required to ensure that vehicles can reliably achieve autonomous driving in real mixed traffic environments. This comprehensive testing may simulate real traffic scenarios and comprehensively evaluate the performance of autonomous vehicles under diverse and complex road conditions.

At present, there is a lack of a connected and autonomous driving ecological environment, and the application of high-level connected and autonomous vehicle collaborative functions is difficult to achieve. Therefore, it is urgent to perform a comprehensive testing of autonomous vehicles in mixed traffic environments with a vehicle-road-cloud integrated transportation system demonstration base. This testing is not limited to software function evaluation, but also includes comprehensive performance testing of autonomous vehicles in real road environments. Therefore, it is necessary to design complex scenarios and tasks to test the reliability and effectiveness of autonomous vehicles. With the improvement of the level of the autonomous vehicles, a number of test scenarios and tasks is continuously increased, and high requirements are provided for the reliability, the efficiency and the safety of the connected and autonomous vehicle test system.

Closed-course testing allows autonomous vehicles to be tested in a controlled environment with manageable risks, which can realistically simulate open traffic scenarios. In addition, the closed road testing enables a tester or a safety personnel to become familiar with the operating procedures, testing methods and takeover procedures of autonomous driving under dangerous conditions, which facilitates the transition to open road testing. The existing mature connected and autonomous vehicle test sites are mainly aimed at testing the performance and efficiency of a single vehicle in simple scenarios, and lack comprehensive testing of vehicles in a strongly coupled, multi-agent mixed traffic system environment. Due to the infinite diversity of test scenarios, an ideal test system should be highly flexible and intelligent, and capable of performing comprehensive testing of autonomous driving in complex traffic environments by designing continuous and diverse test conditions. The system also needs to ensure safe interaction among a plurality of traffic participants while creating conflicts with the autonomous vehicles under test, and be capable of actively generating edge-dangerous scenarios to test the comprehensive performance and potential problems of the autonomous vehicles under test.

In addition, comprehensive testing requires a large amount of test data, including sensor data, vehicle state data, scenario information, and the like. Meanwhile, these data need to be effectively processed and analyzed to extract valuable information and support system improvements. Therefore, the obtaining and processing of test data is a challenging task.

Comprehensive real-vehicle testing of autonomous vehicles plays an important role in ensuring system safety and driving performance. Such testing can provide real-world scenarios and challenges to help verify the reliability and adaptability of autonomous driving systems in diverse road conditions and complex traffic environments. There is an urgent need to perform comprehensive testing of autonomous vehicles in mixed traffic environments to verify system performance, identify problems and make improvements, and promote the further development and commercial application of autonomous driving technology.

SUMMARY

An objective of the present invention is to provide an intelligent testing method for autonomous driving based on interaction of multiple background traffic participants to improve test reliability.

The objective of the present invention may be achieved by the following technical solutions:

An intelligent testing method for autonomous driving based on interaction of multiple background traffic participants includes the following steps:

obtaining a test scenario and path information of traffic participants in the test scenario, wherein the traffic interactors include a vehicle under test and background traffic participants, and the background traffic participants include background vehicles and background pedestrians;

constructing a kinematic model of the background traffic participants based on the path information;

dynamically constructing safety constraints between any two traffic interactors based on the path information;

controlling the background traffic participants to conflict with the vehicle under test based on the kinematic model and the safety constraint, and constructing model prediction control to obtain a reference speed of the background traffic participants under collaborative interaction; and collecting real driving data of the vehicle under test and the background traffic participants in real time, and obtaining a test result of the vehicle under test by multi-dimensional test performance evaluation indicators based on the reference speed and the path information.

Further, the kinematic model is a second-order longitudinal dynamic equation in discrete form, expressed as:

$$\begin{bmatrix} s_m(i+1) \\ v_m(i+1) \end{bmatrix} = \begin{bmatrix} 1 & \Delta t \\ 0 & 1 \end{bmatrix} \begin{bmatrix} s_m(i) \\ v_m(i) \end{bmatrix} + \begin{bmatrix} 0.5\Delta t^2 \\ \Delta t \end{bmatrix} a_m(i)$$

wherein $s_m(i)$, $v_m(i)$ and $a_m(i)$ represent a position, a speed and an acceleration of a $m^{th}$ background traffic participant at an $i^{th}$ moment, and $\Delta t$ is a length of a predefined time interval.

Further, the step of dynamically constructing safety constraints includes:
  constructing a collision area and a potential interaction area of the vehicle under test, the background pedestrians and the background vehicles based on the path information;
  calculating a size of an overlapping interaction area between any two traffic interactors based on the collision area and the potential interaction area; and
  constructing the safety constraints between any two traffic interactors based on the size of the overlapping interaction area.

Further, the size of the overlapping interaction area between any two traffic participants is calculated with a Monte Carlo method, and the size of the overlapping interaction area is calculated by the following expression:

$$A_p^{(m,n)} = (N_{mn}/N_m) \cdot A_m$$

wherein $$A_p^{(m,n)}$$

is an overlapping size of an interaction area between a traffic interactor m and a traffic interactor n, $N_m$, is a number of points evenly distributed in an overlapping size of a potential interaction area between a traffic interactor m and a traffic interactor n, $N_m$ is a total number of points evenly distributed in a potential interaction area of the traffic interactor m, and A, is a size of the potential interaction area of the traffic interactor m.

Further, the safety constraints include a collision area overlapping size constraint and a potential interaction area overlapping size constraint as follows:

$$\sum_{m=1,m \neq n}^{N_v} C_{m,n}(j \mid i) = 0$$

$$J_p^{(m)}(j \mid i) =$$

$$-\left(1 + \sum_{m=1,m \neq n}^{N_v} D_{m,n}(j \mid i) + \omega_v |v_m(j \mid i) v_n(j \mid i)|\right) \cdot H\left(0, \sum_{m=1,m \neq n}^{N_v} D_{m,n}(j \mid i)\right)$$

wherein $\cdot(j \mid i)$ is a predicted value at a current moment i for a time step j+i, $C_{m,n}(j \mid i)$ is a predicted overlapping size of a collision area between a traffic interactor m and a traffic interactor n, Ny is a number of the background traffic participants, $$J_p^{(m)}(j \mid i)$$

is potential interaction cost in a predicted step, $$\sum_{m=1,m \neq n}^{N_v} D_{m,n}(j \mid i)$$

is a predicted overlapping size of a potential interaction area between a traffic interactor m and a traffic interactor n, $\omega_v$ is a relative adjustment weight of influence of speeds and potential interaction area overlapping sizes among traffic interactors on safety interaction between two traffic interactors, $v_m(j \mid i)$ and $v_n(j \mid i)$ are a predicted speed of a traffic interactor m and a predicted speed of a traffic interactor n respectively, and H (p,q) is the indicator function, which takes the value 1 if p<q, and 0 otherwise.

Further, the step of obtaining reference speed includes:
  calculating a Euclidean distance between the vehicle under test and the background traffic participants, and control the background traffic participants to actively conflict with the vehicle under test based on the kinematic model; and
  constructing and solving a discrete model predictive control problem based on the conflict and the safety constraints to obtain the reference speed.

Further, the Euclidean distance is calculated by the following expression:

$$d_{col}(j \mid i) = \min_{m \in \{1,2,\ldots,N_y\}} \left( [x_{test}(j \mid i) - x_m(j \mid i)]^2 + [y_{test}(j \mid i) - y_m(j \mid i)]^2 \right).$$

wherein $\cdot(j \mid i)$ is a predicted value for a time step j+i at a current moment i, $d_{col}(j \mid i)$ is a Euclidean distance between the vehicle under test and a nearest background traffic participant, Ny is a number of background traffic participants, $x_{test}(j \mid i)$ and $y_{test}(j \mid i)$ are predicted values of coordinates of the vehicle under test, and $x_m(j \mid i)$ and $y_m(j \mid i)$ are predicted values of coordinates of the nearest background traffic participant m.

Further, an expression of the model predictive control problem is:

$$\min_{a(\cdot \mid i)} J =$$

$$\sum_{m=1}^{N_v} \left[ J_{dis}^{(m)} + \sum_{j=0}^{N_p-1} \left( \omega_a a_m(j \mid i)^2 + \omega_c J_p^{(m)}(j+1 \mid i) \right) \right] + \sum_{j=0}^{N_p-1} (\omega_{col} d_{col}(j+1 \mid i))$$

$$J_{dis}^{(m)} := \frac{s_{m,max} - s_m(N_p \mid i)}{s_{m,max} - s_{c,m}}$$

s.t.

$$\begin{bmatrix} s_m(i+1) \\ v_m(i+1) \end{bmatrix} = \begin{bmatrix} 1 & \Delta t \\ 0 & 1 \end{bmatrix} \begin{bmatrix} s_m(i) \\ v_m(i) \end{bmatrix} + \begin{bmatrix} 0.5 \Delta t^2 \\ \Delta t \end{bmatrix} a_m(i), \forall m \in I$$

$$\sum_{m=1,m \neq n}^{N_v} C_{mn}(j \mid i) = 0, \forall m \in I$$

$$[s_m(0 \mid i), v_m(0 \mid i)] = [s_{c,m}(i), v_{c,m}(i)], \forall m \in I$$

$$[x_m(j \mid i), y_m(j \mid i), \alpha_m(j \mid i)] = L(s_m(j \mid i)), \forall m \in I$$

$$a_{min} \leq a_m(j \mid i) \leq a_{max}, \forall m \in I$$

$$0 \leq v_m(j \mid i) \leq V_{max,look-up}^{(m)}(s_m(j \mid i)), \forall m \in I$$

wherein $\cdot(j \mid i)$ is a predicted value for a time step j+i at a current moment i, $N_v$ is a number of background traffic participants, $N_p$ is a predicted level step, $\omega_2$ is an adjustment weight of a comfort term, $a_m(j \mid i)$ is a predicted acceleration value of a background traffic participant m, $\omega_c$ is an adjustment weight of a safety guarantee term, $$J_p^{(m)}(j+1|i)$$

is a potential interaction constraint of a background traffic participant m at a moment j+1+i, $\omega_{col}$ is an adjustment weight of a conflict generation term, $d_{col}(j+1|i)$ is a Euclidean distance between the vehicle under test and a background traffic participant at a moment $$j+1+i, J_{dis}^{(m)}$$

is a performance indicator of timely and fast driving of a background traffic participant m under traffic rules, $s_{m,max}$ is a farthest distance of an $m^{th}$ background traffic participant, $s_m(N_p|i)$ is a position of an $m^{th}$ background traffic participant at a moment $N_p+i$, $s_{c,m}$ is an origin position wherein the background traffic participant stays, I={1, 2, ..., $N_v$} is a set of background traffic participants, $s_m(i)$, $v_m(i)$ and $a_m(i)$ represent a position, a speed and an acceleration of an $m^{th}$ background traffic participant at a moment i, $\Delta t$ is a length of a predefined time interval, $C_{m,n}(j|i)$ is a predicted overlapping size of a collision area between a traffic interactor m and a traffic interactor n, $s_m(0|i)$ and $v_m(0|i)$ are initial state values of an $m^{th}$ background traffic participant in a predicted time domain, $S_{c,m}(i)$ and $v_{c,m}(i)$ are a position and a speed of the background traffic participant at the origin, $x_m(j|i)$ and $y_m(j|i)$ are predicted position values of a background traffic participant m, $\alpha_m(j|i)$ is a predicted heading angle value of a background traffic participant m, $L(s_m(j|i))$ is a geometric lookup table defined in a "position" space for a reference path of a background traffic participant m, wherein the position is represented by a distance $s_m(j|i)$ traveled along the reference path, $a_{min}$ and $a_{max}$ are a minimum acceleration value and a maximum acceleration value of a background traffic participant m at a moment j+i, and $$V_{m\times look-up}^{(m)}$$

is a speed table of a background traffic participant m.

Further, the reference speed is solved with a level-k reasoning method.

Further, the multi-dimensional test performance evaluation indicators include a perception performance evaluation indicator, a decision performance evaluation indicator, a control performance evaluation indicator, an interaction performance evaluation indicator, an actual scenario simulation indicator, a system robustness evaluation indicator and a safety evaluation indicator.

Compared with the prior art, the present invention has the following beneficial effects:

(1) The present invention dynamically constructs safety constraints under complex traffic scenarios, controls traffic background participants to actively conflict with a vehicle under test under the condition of ensuring the safety of the traffic background participants and the vehicle under test, and predicts a reference speed and a reference path under multi-vehicle interaction by constructing model prediction control under edge-dangerous conflict scenarios, so as to test the comprehensive performance of the vehicle in a strongly coupled, multi-agent mixed traffic system environment and improve test reliability.

(2) The safety constraints of the present invention provide real-time safety guarantee of decision variables in multi-vehicle collaborative control by accurately modeling and judging to find out sufficient and necessary conditions for the safety of lateral interaction of vehicles, thereby ensuring the safety of lateral interaction of vehicles within a predicted time domain and providing a key safety basis for the practical application of multi-vehicle collaborative driving.

(3) The present invention optimizes the multi-vehicle collaborative speed prediction based on the level-k reasoning principle, and considers an initial value of a to-be-optimized vehicle and an optimal speed of other vehicles when optimizing the speed of each vehicle, thereby achieving the dimension reduction of the control quantity and the convergence of the global optimal speed, improving the speed optimization efficiency and achieving the real-time speed control.

(4) The present invention conducts comprehensive evaluation from a plurality of dimensions by adopting a plurality of evaluation indicators, and the evaluation results are more comprehensive and accurate.

BRIEF DESCRIPTION OF THE DRAWINGS

FIGS. 2A-2B are diagrams of safe interaction area definitions according to an embodiment of the present invention, wherein FIG. 2A is a diagram of full interaction area definitions for vehicles, and FIG. 2B is a diagram of full interaction area definitions for background pedestrians;

DETAILED DESCRIPTION OF THE EMBODIMENTS

The present invention is described in detail below with reference to the accompanying drawings and specific embodiments. This embodiment is implemented based on the technical solution of the present invention, and provides a detailed implementation method and a specific operation process, but the protection scope of the present invention is not limited to the following embodiments.

Figure 1:
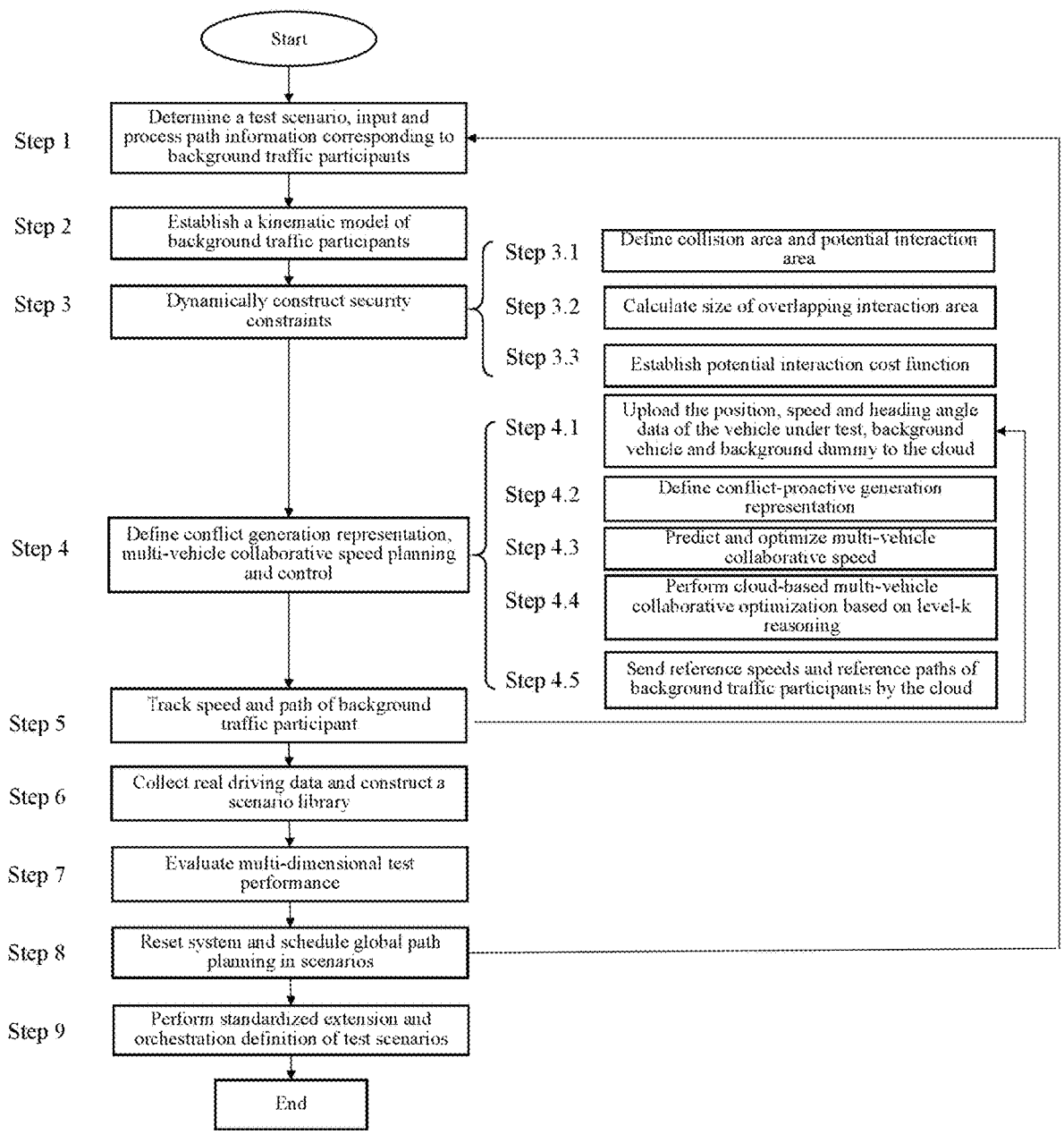
FIG. 1 is a schematic flow chart of a method according to the present invention.

This embodiment provides an intelligent testing method for autonomous driving based on interaction of multiple background traffic participants, as shown in FIG. 1, which includes the following steps:

Step 1: A test scenario is determined, and path information corresponding to background traffic participants is inputted and preprocessed.

First, a test scenario is determined, and a test path is generated based on a typical test scenario or a real test incident case. The test path information includes an x-coordinate of the reference path in a universal transverse mercartor (UTM) grid system and a y-coordinate of the reference path in the UTM, and the like. After duplicate points are removed from an input test scenario path, the duplicate points are interpolated into coordinate points with distances evenly distributed on the path. According to the positioning coordinates, heading angle and other information uploaded by a $m^{th}$ traffic interactor, a position representation on the reference path is established, and a horizontal coordinate is defined as $x_m$, a vertical coordinate is defined as $y_m$, and the heading angle is defined as $\alpha_m$, which is used to represent the position of the $m^{th}$ traffic interactor on the reference path. $x_r$, $y_r$, and $\alpha_r$, represent predefined reference paths that the $m^{th}$ traffic interactor should follow. The reference path for each traffic interactor is defined as a geometric lookup table $L^{(m)}(s_m(i))$ in a "position" space, wherein the position is represented by a distance $s_m(i)$ traveled along the reference path. $P(m)=\{x_r,y_r,\alpha r\in \Box|[x_r,y_r,\alpha_r]^T=L^{(m)}(s_m(i))\}$ Step 2: A kinematic model of background traffic participants is established.

In this embodiment, consider a group of controlled background participants $I=\{1, 2, \ldots, N_v\}$ traveling along a reference path P, wherein $N_v$ is the number of controlled background participants.

The second-order longitudinal dynamic equation in discrete form is established for the $m^{th}$ traffic interactor:

$$\begin{bmatrix} s_m(i+1) \\ v_m(i+1) \end{bmatrix} = \begin{bmatrix} 1 & \Delta t \\ 0 & 1 \end{bmatrix} \begin{bmatrix} s_m(i) \\ v_m(i) \end{bmatrix} + \begin{bmatrix} 0.5\Delta t^2 \\ \Delta t \end{bmatrix} a_m(i),$$

wherein $\Delta_t > 0$ represents a length of a predefined time interval; and $s_m(i)$, $v_m(i)$ and $\alpha_m(i)$ represent a position, a speed and an acceleration of the $m^{th}$ traffic interactor at a moment i.

Step 3: Security constraints are dynamically constructed.

Aiming at the problem that it is difficult to ensure the interactive safety of traffic interactors corresponding to decision variables in the predicted time domain in multi-vehicle collaborative control, the lateral collision avoidance judgment basis for the multi-vehicle collaborative control interaction of a plurality of traffic interactors is studied; and the real-time safety guarantee of decision variables in multi-vehicle collaborative control is provided by accurately modeling and judging to find out sufficient and necessary conditions for the safety of lateral interaction of a plurality of traffic interactors, thereby ensuring the safety of lateral interaction within the predicted time domain and providing a key safety basis for the practical application of collaborative driving of the plurality of traffic interactors.

The specific steps of the step 3 include:

Step 3.1: Definition of collision area and potential interaction area.

Figure 2A:
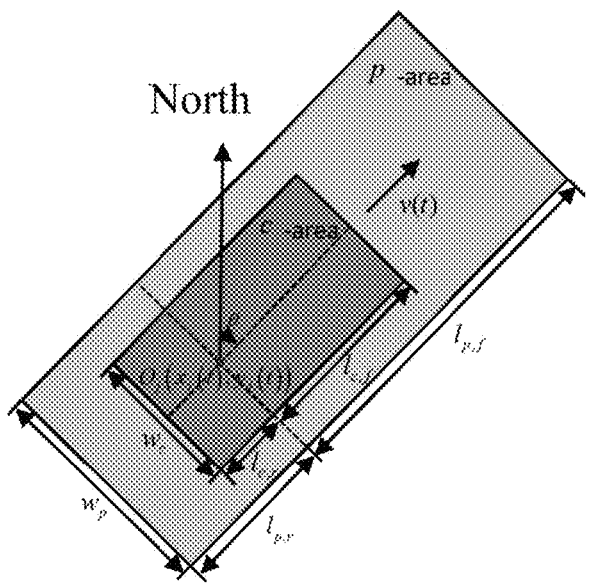
Figure 2B:
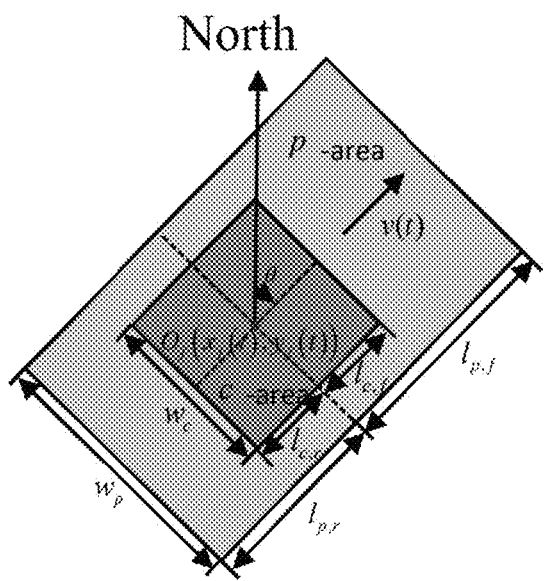

When evaluating a potential collision between two vehicles from a bird's eye view, the vehicles are conceptualized as two-dimensional rectangular entities with defined planar dimensions. A rectangular box with a size equal to actual length and width dimensions of the vehicle is defined as the "collision area". The distances between the vehicle sensor and the front and rear ends of the rectangle are represented as $l_{c,f}$ and $l_{c,r}$, respectively. The sensor is positioned at a lateral centerline of the vehicle. The position, the heading $\theta$ (defined as north, increasing clockwise), and the width w, of the vehicle are known. The collision area (c-area) of the vehicle may be represented by a 6-tuple (x, y, $\theta$, $l_{c,f}$, $l_{c,r}$, $w_c$). In addition, a "potential interaction area" (p-area) of the vehicle is defined to represent a rectangle sharing the same longitudinal symmetry line as the c-area of the vehicle and exceeding the c-area with a safety margin, as shown in FIG. 2A. The width of the potential interaction area is set to be $w_p$, which is generally less than the width of a lane. The distances between the vehicle sensor and the front/rear end of the rectangle are represented as $L_{p,f}$ and $L_{p,r}$ . . . , respectively. Since the speed in the driving direction varies widely, to ensure the safety of vehicle interaction, $L_{p,f}$ and $l_{c,f}$ should be set greater than $L_{p,r}$ and $l_{c,r}$. The 6-tuple (x, y, $\theta$, $l_{p,f}$, $l_{p,r}$, $w_p$) is used to describe the potential interaction area of the vehicle. Similarly, a background pedestrian is defined as a two-dimensional rectangular entity with a planar size, and a rectangular box whose size is equal to the actual length and width of the background pedestrian's moving chassis is defined as the "collision area". In addition, a "potential interaction area" (p-area) of the background pedestrian is defined to represent a rectangle sharing the same longitudinal symmetry line as the c-area of the background pedestrians and exceeding the c-area with a safety margin, as shown in FIG. 2B.

Step 3.2: The size of the overlapping interaction area is calculated.

The overlapping size between two vehicles is calculated by adopting the Monte Carlo method. Specifically, points uniformly distributed within the potential interaction area of background traffic participants are used to approximate a target value. The overlapping size is calculated by the formula $$A_p^{(m,n)} = (N_{mn}/N_m) \cdot A_m,$$

wherein $N_{mm}$ is a number of points evenly distributed in an overlapping size of a potential interaction area between a traffic interactor m and a traffic interactor n, $N_m$ is a total number of points evenly distributed in a potential interaction area of the traffic interactor m, and $A_m$, is a potential interaction size of the traffic interactor m. A overlapping size of the collision area equal to zero indicates a safe interaction, without producing an actual collision. Conversely, the overlapping size greater than zero indicates a collision. This method conducts a comprehensive assessment of collision risk based on the spatial relationship and orientation of vehicles on a two-dimensional plane. It is defined that the overlapping size of the collision area between a traffic interactor m and a traffic interactor n is represented by $C_{m,n}$, and the overlapping size of the potential interaction area is represented by Dm.

Step 3.3: The potential interaction cost function is established.

In the optimization process, different constraints are applied to the p-area and c-area to ensure that the interactions among a plurality of traffic interactors are safe. The overlapping size of the c-area of two traffic interactors must be strictly equal to 0, i.e., $$\sum_{m=1,m\neq n}^{N_v} C_{m,n}(j|i) = 0.$$

When $$\sum_{m=1,m\neq n}^{N_v} C_{m,n}(j|i) > 0,$$

it means that a collision has occurred, so the penalty weight in the cost function is very large to avoid collision. Although the overlapping size of the c-area of two traffic interactors must be equal to zero, limited overlap is allowed in the potential interaction area. $J_p$ is a reward function used to describe the potential interactions among a plurality of traffic interactors.

$$J_p^{(m)}(j|i) = -\left(1 + \sum_{m=1, m \neq n}^{N_v} D_{m,n}(j|i) + \omega_v |v_m(j|i) v_n(j|i)|\right) \cdot H\left(0, \sum_{m=1, m \neq n}^{N_v} D_{m,n}(j|i)\right),$$

wherein $$\sum_{m=1, m \neq n}^{N_v} D_{m,n}(j|i)$$

represents the prediction of the overlapping area of the p-area between the traffic interactors m and n. H(p,q) is defined as an indicator function that takes the value 1 when p<q and 0 otherwise. $v_m(j|i)$ and $v_n(j|i)$ are the speeds of traffic interactors m and n in the predicted time domain, respectively. When the overlap area of p-area between any two traffic interactors is zero, it indicates that there is no potential interaction, and $J_p$=0. When $$\sum_{m=1, m \neq n}^{N_v} D_{m,n}(j|i) > 0,$$

it indicates that there is a collision risk. The penalty for collision depends on the size of the p-area overlap area and the speed of the traffic interactors. Specifically, the higher the value of $$\sum_{m=1, m \neq n}^{N_v} D_{m,n}(j|i)$$

and the absolute values of $v_m(j|i)$ and $v_n(j|i)$ above, the higher the penalty assigned, which reflects the likelihood of a potentially more severe collision. The weight $\omega_v$>0 adjusts the relative influence between the overlap area and the speed. In addition, the inclusion of 1 ensures a baseline penalty in overlapping areas or wherein speed is relatively low.

Step 4: The coordinated speed of a plurality of traffic interactors is predicted and optimized.

Step 4.1: The position, speed and heading angle data of the vehicle under test, background vehicles and background dummy are uploaded to the cloud.

Figure 3:
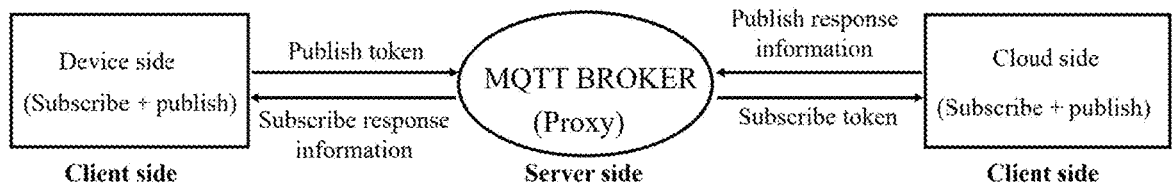
FIG. 3 is a communication protocol framework diagram according to an embodiment of the present invention.
Figure 4:
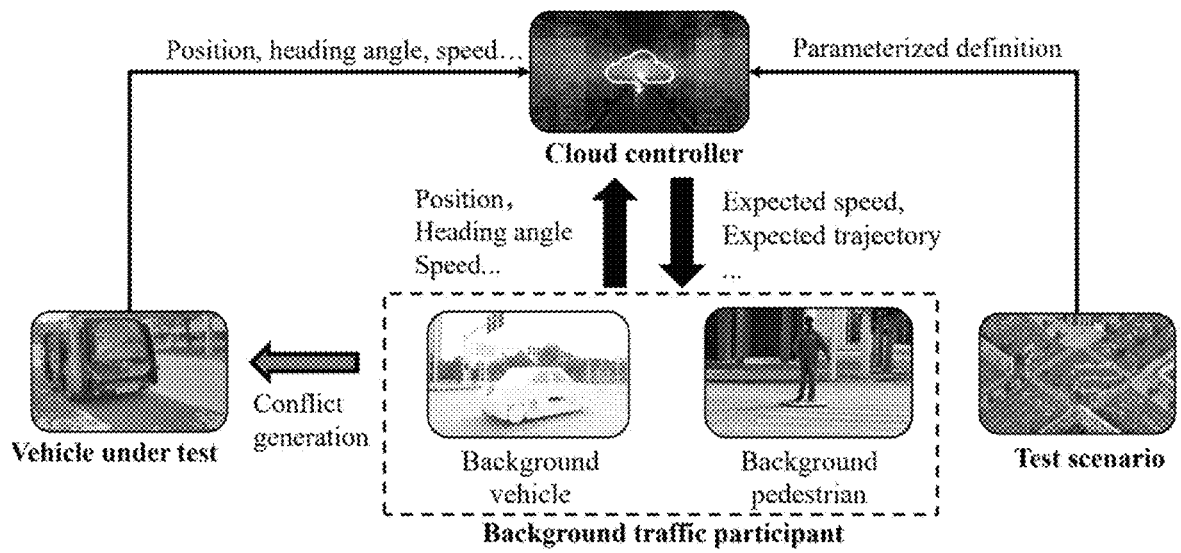
FIG. 4 is a schematic diagram of data stream transmission according to an embodiment of the present invention.

The cloud server communicates with background traffic participants through a message queuing telemetry transport (MQTT) protocol, as shown in FIG. 3, which can meet the requirements of real-time control. The vehicle and background pedestrians uploaded to the cloud timestamp, x-coordinate of the reference path in the UTM coordinate system, y-coordinate of the reference path in the UTM coordinate system, heading angle, actual speed, and the like are shown in FIG. 4.

Step 4.2: A conflict-proactive generation representation is defined.

To achieve the expected results of testing autonomous vehicles, background vehicles and background pedestrians need to actively create conflicts with the vehicle under test as much as possible, so as to test the comprehensive performance of autonomous vehicles in a strongly coupled, multi-agent mixed traffic system environment.

To prevent deadlock and traffic congestion, the vehicle under test is selectively controlled to collide only with the closest background traffic participant. $d_{col}$ represents the Euclidean distance between the vehicle under test and the nearest background traffic participant.

$$d_{col}(j|i) = \min_{m \in \{1,2,\ldots,N_v\}} \left( [x_{test}(j|i) - x_m(j|i)]^2 + [y_{test}(j|i) - y_m(j|i)]^2 \right).$$

Based on the second-order longitudinal dynamic equation in the step 2, the speeds of the vehicle under test (VUT) and surrounding traffic interactors are predicted. This results in the set of all possible positions and speeds that the traffic interactors can reach. The door term is added to the cost function. By minimizing the cost function, the background traffic participants can be close to the VUT to form a conflict.

The proximity of the background traffic participants to the VUT is adjusted by the weight $\omega_{col}$, that is, the intensity of the test scenario. It should be noted that the penalty $\omega_{col}$ associated with a distance cost function is less than the safety penalty, thereby actively generating conflict scenarios and ensuring the safety of multi-vehicle collaborative interaction. The intensity of the test scenario may be adjusted according to $\omega_{col}$. The larger $\omega_{col}$ is, the more intense the conflict is, thus simulating the driving behavior of the test vehicle under different traffic conditions.

This approach may test the responsiveness and adaptability of the vehicle under test in extreme situations, as well as determine operating limits of the vehicle under different background vehicle distances and trigger time conditions. The comprehensive performance of autonomous vehicles is understood through in-depth study of the boundary conditions for safe operation of the vehicle under test.

Step 4.3: Multi-vehicle collaborative speed is predicted and optimized.

To solve the collaborative control and conflict generation in all possible complex scenarios, including intersections, lane changes, ramps and roundabouts, the established control problem is not limited to a specific scenario. Background traffic participants consider interactions with other traffic interactors separately when evaluating actions. m represents an ego car, and n represents another traffic interactor that interacts with m. Considerations include safety constraints, control input constraints, and state constraints involving speed and travel distance. A model predictive control (MPC) formula in discrete form is established. At each moment i, the following control problem is solved to obtain the optimal reference speed.

$$\min_{a(\cdot|i)} J = \sum_{m=1}^{N_v} \left[ J_{dis}^{(m)} + \sum_{j=0}^{N_p-1} \left( \omega_a a_m(j|i)^2 + \omega_c J_p^{(m)}(j+1|i) \right) \right] + \sum_{j=0}^{N_p-1} (\omega_{col} d_{col}(j+1|i))$$

s.t.

-continued $$\begin{bmatrix} s_m(i+1) \\ v_m(i+1) \end{bmatrix} = \begin{bmatrix} 1 & \Delta t \\ 0 & 1 \end{bmatrix} \begin{bmatrix} s_m(i) \\ v_m(i) \end{bmatrix} + \begin{bmatrix} 0.5\Delta t^2 \\ \Delta t \end{bmatrix} a_m(i), \forall m \in I$$

$$\sum_{m=1, m \neq n}^{N_v} C_{mn}(j|i) = 0, \forall m \in I$$

$$[s_m(0|i), v_m(0|i)] = [s_{c,m}(i), v_{c,m}(i)], \forall m \in I$$

$$[x_m(j|i), y_m(j|i), \alpha_m(j|i)] = L(s_m(j|i)), \forall m \in I$$

$$a_{min} \leq a_m(j|i) \leq a_{max}, \forall m \in I$$

$$0 \leq v_m(j|i) \leq V^{\{m\}}_{max,look-up}(s_m(j|i)), \forall m \in I$$

wherein ·(j|i) is a predicted value for a time step j+i at a current moment i. An acceleration sequence used by the model is $a=[a_1, a_2, \ldots, a_N]^T$, wherein $N_p$ is a predicted time domain step; $s_{m,0}$ and $v_{m,0}$ are initial state values of the $m^{th}$ background traffic participant in the predicted time domain; and $a_{min}$ and $a_{max}$ are a minimum acceleration limit and a maximum acceleration limit of the background traffic participant, respectively. To avoid sudden jolts or jerky movements that may cause discomfort, $a_m(j|i)^2$ may be minimized, resulting in smoother motion of background traffic participants.

The current maximum speed limit is obtained by looking up the speed table $$V^m_{max,look-up}$$

based on the current position. $v_{max}$ (m, $s_m(i)$) is the maximum speed of the $m^{th}$ background traffic participant at the position $s_m(i)$. To improve the real-time calculation speed, the maximum speed limit is calculated offline based on the path curvature.

To prevent deadlock among a plurality of background traffic participants, the $J_{dis}$ term is used to improve driving efficiency and is defined as a performance indicator of timely and fast driving under traffic rules, that is, $$J^{\{m\}}_{dis} := \frac{s_{m,max} - s_m(N_p|i)}{s_{m,max} - s_{c,m}},$$

$s_m(N_p|i)$ is the position of the $m^{th}$ background traffic participant at the moment $N_p+i$, and the speed is $$v_m(j|i) = V^{\{m\}}_{m,look-up}(s_m(j|i)).$$

For j=1, 2, ..., $N_p$, the $m^{th}$ background traffic participant travels at the maximum speed allowed by traffic regulations and road restrictions, and other background traffic participants are ignored. $J_{dis} \in [0,1]$, wherein $J_{dis}=0$ represents the most active driving, driving to the farthest distance $s_{m,max}$; and $J_{dis}=1$ represents still staying at the origin $s_{c,m}$.

Step 4.4: Cloud-based multi-vehicle collaborative optimization is performed based on level-k reasoning.

Considering the initial value of the to-be-optimized background traffic participant and the optimal speed of other background traffic participants, the speed of each background traffic participant is optimized to achieve convergence to the global optimal speed. During the optimization process, it is initially assumed that the speed of each background traffic participant has an initial value. In each iteration, the first step involves optimizing the speed of the first background traffic participant. This optimization considers the initial values of the other background traffic participants and thus determines the optimal speed of the first background traffic participant. Subsequently, in the second step, the speed of the second background traffic participant is optimized based on the optimal speed of the first background traffic participant and the initial values of all other background traffic participants. This process is repeated iteratively, with the speed of each subsequent background traffic participant optimized by taking into account the optimal speed of the preceding background traffic participant and the initial values of the remaining background traffic participants.

During the optimization process of the $m^{th}$ background traffic participant, the terms $J_p^{\{m\}}$ and $d_{col}$ depend on the states of other traffic interactors. The cost function is represented as:

$$\min_{a(\cdot|i)} J^{\{m\}} = J^{\{m\}}_{dis} + \sum_{j=0}^{N_p-1} \left( \omega_a a_m(j|i)^2 + \omega_c J^{\{m\}}_p(a_m, a_{\bar{m}}) \right) + \omega_{col} d_{col}(a_m, a_{\bar{m}})$$

wherein $a_m$ represents the $m^{th}$ background traffic participant being optimized, and the state variables are omitted for simplicity. $\alpha_{\bar{m}}$ represents the mixture of the optimal value $a_1^*, \ldots, \alpha_{m-1}$ obtained for background traffic participants 1 to m−1 in the previous steps and the initial values $\alpha_{m+1}^{ini}, \ldots, a_{N_v}^{ini}$ for background traffic participants m+1 to $N_v$ in the current iteration, that is, $\alpha_{\bar{m}}=\{a, \ldots, \alpha_{m-1}, a_{m+1}^{ini}, \ldots, a_{N_v}^{ini}\}$. The optimization of $J_p^{\{m\}}$ and $d_{col}$ involves solving $a_m$ for the $m^{th}$ background traffic participant, and all terms in $a_{\bar{m}}$ are fixed. Therefore, $J_p^{\{m\} \text{ and } d}{}_{col}$ achieve the dimension reduction of control quantity.

Figure 5:
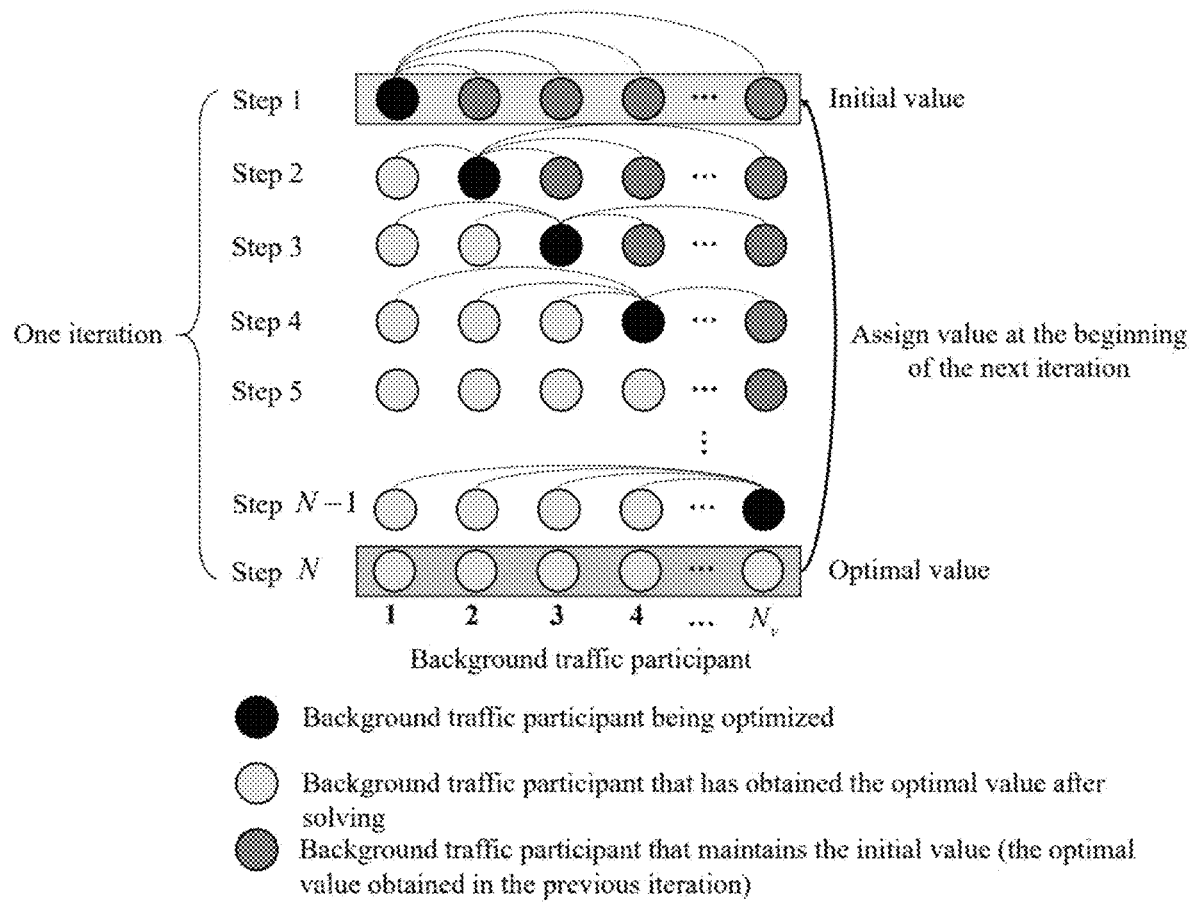
FIG. 5 is a schematic diagram of an iterative calculation method according to an embodiment of the present invention.

This sequential optimization continues until all $N_v$ background traffic participants are optimized individually and obtain their respective optimal speeds. The next iteration starts with using the optimal speed obtained by each background traffic participant in the previous round as a new initial value of the background traffic participant. This loop process gradually converges towards the global optimum in iterations. The iterative process is shown in FIG. 5, wherein the circles in the figure represent the $m^{th}$ background traffic participant being optimized, the m+1 th to $N_v^{th}$ background traffic participants with initial values or optimal values obtained in the previous iteration, and the $1^{st}$ to m−$1^{th}$ background traffic participants that have been optimized and obtained the optimal values.

Based on the level-k reasoning principle, when the speed of each background traffic participant is optimized, the initial value of the to-be-optimized background traffic participant and the optimal speed of other background traffic participants are considered, so that the dimension reduction of the control quantity and the convergence of the global optimal speed are achieved, the speed optimization efficiency is improved, and the real-time speed control is achieved.

Step 4.5: The cloud sends the reference speeds and reference paths of background traffic participants.

The cloud sends control information such as reference speeds and reference paths of background vehicles and background pedestrians by an MQTT protocol, wherein the control information includes a timestamp, an x coordinate of the reference path in a UTM coordinate system, a y coordinate of the reference path in the UTM coordinate system, a course angle, a reference speed and the like.

Step 5: Background traffic participant speed and path tracking.

Firstly, a lateral dynamics model is established according to the state parameters and uncertainty parameters of background vehicles and background pedestrians. This model considers the motion characteristics of different background traffic participants in the lateral direction, including lateral position, lateral speed, lateral acceleration, and the like. Based on the lateral dynamics model of background traffic participants, a path tracking kinematic model is established. The model represents the lateral position deviation in path tracking, the yaw angle deviation and the derivatives thereof as a function of the background traffic participant state and the desired path information by defining the lateral position deviation and the yaw angle error.

Then, the path tracking servo equality constraint is established by using a path tracking kinematic model. This involves defining equality constraints that the lateral position deviation and the yaw angle error approach zero, transforming the goal of background traffic participant path tracking into a servo-constrained control task. Based on the path tracking servo equality constraint, the lateral dynamics model of background traffic participants is controlled to obtain a path tracking controller. This controller can make the lateral position deviation and yaw angle error of background traffic participants approach zero, achieving the goal of path tracking. The system obtains feedback information in real time by positioning sensors to correct and optimize path planning and speed planning. This enables the system to adapt to different road conditions and traffic situations, improving the robustness and adaptability of path tracking.

Path tracking control algorithms include, but are not limited to: control algorithms based on road geometry principles, such as pure tracking control, Stanley control, and Alice control; path tracking control algorithms based on classical control theory, such as PID control and linear feedback control; and path tracking control algorithms based on modern control theory, such as MPC control and LQR control. These algorithms may be selected and switched based on actual scenarios and requirements.

Step 6: Real driving data is collected and a scenario library is constructed.

First, the scenario path in actual driving is collected by an in-vehicle positioning sensor. The process involves obtaining information such as the position, speed, and direction of the vehicle in geographic space by using the vehicle positioning sensor. Driving behavior, including acceleration, deceleration, emergency braking and other dynamic behaviors, is monitored using in-vehicle sensors. Such information can be obtained in real time by connection with an electronic control unit (ECU) or other related sensors of the vehicle.

The collected scenario data is then processed and annotated to ensure the accuracy and usability of the data. The processing may include steps such as denoising, interpolation, and data alignment, and the annotation involves annotating specific driving scenarios or behaviors. The processed and annotated scenario data is stored in the database to ensure that the data may be retrieved and used at any time during testing. The database is in json or other formats to support effective data management and query.

Finally, by continuously updating and accumulating scenario data in actual driving, the system can reflect driving behaviors in different time periods and conditions, increasing the authenticity and representativeness of the test. The test system may use this data to reproduce tests or expand test scenarios to evaluate the performance and robustness of the autonomous driving system in different scenarios.

Step 7: Multi-dimensional test performance evaluation.

The evaluation of the autonomous vehicle is mainly performed from seven aspects of perception performance evaluation, decision performance evaluation, control performance evaluation, interaction performance evaluation, actual scenario simulation, system robustness evaluation, and safety evaluation.

For perception performance evaluation, the accuracy difference between the perception system output and the actual data is calculated by using the root mean square error (RMSE). Coverage and error rate are used to measure the recognition coverage of the perception system for the target and to evaluate the perception range and angle.

The decision performance evaluation includes the planning path accuracy, which is quantified by the calculation of path deviation and path tracking error. The path error is $$\varepsilon = \frac{1}{N}\sum_{i=1}^{N}|d_i|,$$

wherein $d_i$ represents a distance deviation of the $i^{th}$ point on the path, and N represents the coordinates of all points on the path. In addition, the timeliness of decision execution measures the rapid response of the vehicle to changes in the external environment through decision response time.

The control performance evaluation considers vehicle stability and is assessed using the standard deviation of the lateral and longitudinal accelerations of the vehicle. Acceleration and braking performance are quantified using average acceleration and braking distance.

In the interactive performance evaluation, the interaction between vehicles is considered, and the vehicle collaboration is evaluated by the minimum safety margin and the interaction time. The intersection behavior is evaluated using the percentage of compliance with traffic rules and the percentage of safe passage as indicators.

In terms of actual scenario simulation, the diversity and authenticity of the test scenarios are evaluated through scenario coverage and driving behavior realism. The influence of weather and lighting conditions considers the stability of sensor performance under different environmental conditions.

The system robustness evaluation includes fault recovery capability, and the fault handling capability of the system is evaluated with the success rate and time of system automatic recovery. The robustness testing evaluates the robustness of the system by measuring the performance stability of the system under different environments and communication disturbances.

In terms of safety evaluation, emergency braking and avoidance operations are considered, and the safety response of the system in emergency situations is evaluated with the braking time and avoidance success rate. The risk prediction evaluates the ability of the system to identify potential risks with risk prediction accuracy and false negative rate.

Step 8: System is reset and global path planning is scheduled in a scenario.

First, the reset signal is confirmed. Since the scenario test is completed or the cloud receives a reset request signal sent by background traffic participants (the signal may be a preset hardware trigger, software instruction or anomaly detection trigger signal), the cloud then makes a judgment and actively sends a reset instruction.

The system stops the current task: After receiving the reset signal, the system stops the currently executing test task, including path and speed tracking, obstacle avoidance and other tasks. Based on ensuring the safety of interactions among all traffic participants, the brakes are controlled by the cloud to ensure that background traffic participants are in a safe state. The background traffic participants upload the current state information including key parameters such as position, speed and heading angle to the cloud.

Then the next test scenario information is confirmed, and the scenario information of the external environment or the internal database is received, including the preset path information of the next test scenario (including path coordinates, heading angle, and the like).

The scenario information is parsed, and a test scenario model is established based on map data (OpenDRIVE and other formats, including road networks, traffic rules, traffic signs, and the like) and scenario definition parameters. A suitable path planning algorithm is selected, which may be a graph search-based algorithm, an optimization algorithm, or a deep learning method. According to the dynamic and kinematic characteristics of different traffic interactors, such as the motion chassis and dummy motion platform, the map and vehicle dynamics, as well as dynamic constraints such as the safe distance and minimum turning radius of the vehicle are considered to ensure that the global path planning method is effectively implemented under dynamic constraints and traffic rules after given random starting and ending points.

The selected path planning algorithm is executed to generate a global path, ensuring that the path meets the task requirements and obstacle avoidance conditions. The generated global path is sent to the background traffic participants in real time for execution based on current real-time positions of the background traffic participants. When the path re-planning under the conditions of short-time information loss and test failure is processed, a robust planning method of the moving body driving path is adopted. The method can actively cope with the information loss, and ensures that the vehicle can safely and efficiently re-plan the driving path in a dynamically changing environment.

Finally, the background traffic participant sends a reset completion confirmation signal to the cloud, which indicates that the background traffic participant has completed the reset and arrived at the starting point of the next test scenario path, and the next round of testing may be performed.

Step 9: Standardized extension and orchestration definition of test scenarios.

To achieve the generalization and portability of path planning algorithms in different test sites and environments, the present invention provides a universal path planning system and a self-calibration method thereof. The system is designed to ensure path planning for different moving bodies and map data under given map data formats, input parameters, and moving body shapes and motion characteristics. The following are specific implementations of the present invention:

First, a general path planning architecture is adopted, which includes technical modules such as global path planning, middle-level local path planning, and lower-level trajectory planning. The global path planning is responsible for finding a high-level path from the starting point to the target point in the entire map. The middle-level local path planning considers the current state of the vehicle and the dynamic changes of the environment based on the global path to generate a more adaptable local path. The lower-level trajectory planning is responsible for converting the local path into a specific trajectory that the vehicle can execute.

Secondly, a self-calibration method is introduced, which can adapt to different geographical environments and vehicle characteristics. Through online calibration of input parameters, the system can adjust the parameters of the algorithm to adapt to different map data and moving body conditions, thereby improving the robustness and performance of path planning.

The key technologies involved also include vehicle-side planning and control based on conventional working conditions, vehicle-side planning and control based on unconventional working conditions, and vehicle-side planning and control considering time delay uncertainty. These technologies ensure the reliability and safety of the path planning system in various working conditions and environments.

This universal path planning architecture and self-calibration method achieves the generalization and portability application of path planning algorithms in different geographical environments and vehicle characteristics. This versatility and adaptability make the path planning system more portable and suitable for different test scenarios, and can promote the comprehensive verification and application of autonomous driving technology.

The present invention collects the real driving data of the autonomous vehicle, evaluates the comprehensive behavior of the autonomous vehicle, and builds a scenario library, which helps to enrich the test scenario library, achieves the standardized extension and orchestration definition of test scenarios, helps the test system generate more challenging edge-danger test scenarios, and is beneficial to expanding the application to different test sites and different test conditions.

When the foregoing functions are implemented in a form of a software functional unit and sold or used as a separate product, the functions may be stored in a computer-readable storage medium. Based on such understanding, the technical solutions of the present invention essentially can be, or part of the technical solutions contributing to the prior art can be, or part of the technical solutions can be embodied in the form of a software product. The computer software product is stored in a storage medium and includes several instructions for enabling a computer device (which can be a personal computer, a server, a network device or the like) to implement all or part of the steps of the method described in the embodiments of the present invention. The foregoing storage medium includes any medium that can store program code, such as a USB flash drive, a removable hard disk, a read-only memory (ROM), a random access memory (RAM), a magnetic disk, or an optical disc.

It should be appreciated by those skilled in the art that embodiments of the present invention may be provided as a method, a system, or a computer program product. Therefore, the present invention may use a form of hardware only embodiments, software only embodiments, or embodiments with a combination of software and hardware. Furthermore, the present invention may take the form of a computer program product implemented on one or more computer-usable storage media (including, but not limited to, disk memory, CD-ROM, optical memory, and the like) containing computer-usable program codes. The solutions in the embodiments of the present invention may be implemented using various computer languages, such as the object-oriented programming language Java and the interpreted scripting language JavaScript.

The present invention is described with reference to flowcharts and/or block diagrams of a method, a device (system), and a computer program product according to the present invention. It should be understood that each procedure and/or block of the flowcharts and/or block diagrams, and a combination of procedures and/or blocks in the flowcharts and/or block diagrams, can be implemented by computer program instructions. These computer program instructions may be provided to a processor of a general purpose computer, a dedicated computer, an embedded processor or other programmable data processing devices to produce a machine, such that the instructions executed by the processor of the computer or other programmable data processing devices produce an apparatus for implementing the functions specified in one or more procedures in the flowcharts and/or one or more blocks of block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the preferred embodiments of the present invention have been described, those skilled in the art can make changes and modifications to these embodiments once they learn the basic inventive concept. Therefore, the following claims are intended to be construed as to cover the preferred embodiments and all changes and modifications falling within the scope of the present invention.

It is clear that those skilled in the art can make various modifications and variations to the present invention without departing from the spirit and scope of the present invention. The present invention is intended to cover these modifications and variations provided that they fall within the scope of protection defined by the claims of the present invention and their equivalent technologies.

What is claimed is:

1. An intelligent testing method for autonomous driving based on interaction of multiple background traffic participants, comprising:
   using a processor resident in a cloud server, obtaining a test scenario and path information of traffic participants in the test scenario, wherein the traffic interactors comprise a vehicle under test and background traffic participants, and the background traffic participants comprise background vehicles and background pedestrians, wherein the path information is received via a wireless vehicle-to-everything (V2X) communication interface using a message queuing telemetry transport (MQTT) protocol;
   generating, by the processor, a kinematic model of the background traffic participants based on the path information;
   computing, by the processor, safety constraints between any two traffic interactors based on the path information;
   controlling, by the processor, the background traffic participants to conflict with the vehicle under test based on the kinematic model and safety constraint, by generating low-latency control commands and transmitting the control commands via the wireless V2X communication interface to actuate throttle, brake, or motion-platform hardware of the background vehicles and background pedestrians, and constructing model prediction control to obtain a reference speed of the background traffic participants under collaborative interaction; and
   collecting, by the processor, real driving data of the vehicle under test and the background traffic participants in real time via the wireless V2X communication interface, and obtaining a test result of the vehicle under test by multi-dimensional test performance evaluation indicators based on the reference speed and the path information.

2. The intelligent testing method for autonomous driving based on interaction of multiple background traffic participants according to claim 1, wherein the kinematic model is a second-order longitudinal dynamic equation in discrete form, expressed as:

$$\begin{bmatrix} s_m(i+1) \\ v_m(i+1) \end{bmatrix} = \begin{bmatrix} 1 & \Delta t \\ 0 & 1 \end{bmatrix} \begin{bmatrix} s_m(i) \\ v_m(i) \end{bmatrix} + \begin{bmatrix} 0.5\Delta t^2 \\ \Delta t \end{bmatrix} a_m(i)$$

wherein $s_m(i)$, $v_m(i)$ and $\alpha_m(i)$ represent a position, a speed and an acceleration of a $m^{th}$ background traffic participant at an $i^{th}$ moment, and $\Delta t$ is a length of a predefined time interval.

3. The intelligent testing method for autonomous driving based on interaction of multiple background traffic participants according to claim 1, wherein the step of dynamically constructing safety constraints comprises:
   constructing a collision area and a potential interaction area of the vehicle under test, the background pedestrians and the background vehicles based on the path information;
   calculating a size of an overlapping interaction area between any two traffic interactors based on the collision area and the potential interaction area; and
   constructing the safety constraints between any two traffic interactors based on the size of the overlapping interaction area.

4. The intelligent testing method for autonomous driving based on interaction of multiple background traffic participants according to claim 3, wherein the size of the overlapping interaction area between any two traffic participants is calculated with a Monte Carlo method, and the size of the overlapping interaction area is calculated by the following expression:

$$A_p^{(m,n)} = (N_{mn}/N_m) \cdot A_m$$

wherein $$A_p^{(m,n)}$$

is an overlapping size or an interaction area between a traffic interactor m and a traffic interactor n, $N_{mn}$ is a number of points evenly distributed in an overlapping size of a potential interaction area between a traffic interactor m and a traffic interactor n, $N_m$ is a total number of points evenly distributed in a potential interaction area of the traffic interactor m, and $A_m$ is a size of the potential interaction area of the traffic interactor m.

5. The intelligent testing method for autonomous driving based on interaction of multiple background traffic participants according to claim 3, wherein the safety constraints comprise a collision area overlapping size constraint and a potential interaction area overlapping size constraint as follows:

$$\sum_{m=1,m\neq n}^{N_v} C_{m,n}(j|i) = 0$$

$$J_p^{(m)}(j|i) =$$

$$-\left(1 + \sum_{m=1,m\neq n}^{N_v} D_{m,n}(j|i) + \omega_v |v_m(j|i)v_n(j|i)|\right) \cdot H\left(0, \sum_{m=1,m\neq n}^{N_v} D_{m,n}(j|i)\right)$$

wherein ·(j|i) is a predicted value at a current moment i for a time step j+i, $C_{m,n}(j|i)$ is a predicted overlapping size of a collision area between a traffic interactor m and a traffic interactor n, $N_v$ is a number of the background traffic participants, $$J_p^{(m)}(j|i)$$

is potential interaction cost in a predicted step, $$\sum_{m=1,m\neq n}^{N_v} D_{m,n}(j|i)$$

is a predicted overlapping size of a potential interaction area between a traffic interactor m and a traffic interactor n, $\omega_v$ is a relative adjustment weight of influence of speeds and potential interaction area overlapping sizes among traffic interactors on safety interaction between two traffic interactors, $v_m(j|i)$ and $v_n(j|i)$ are a predicted speed of a traffic interactor m and a predicted speed of a traffic interactor n respectively, and H (p,q) is the indicator function, which takes the value 1 if p<q, and 0 otherwise.

6. The intelligent testing method for autonomous driving based on interaction of multiple background traffic participants according to claim 1, wherein the step of obtaining reference speed comprises:
calculating a Euclidean distance between the vehicle under test and the background traffic participants, and control the background traffic participants to actively conflict with the vehicle under test based on the kinematic model; and
constructing and solving a discrete model predictive control problem based on the conflict and the safety constraints to obtain the reference speed.

7. The intelligent testing method for autonomous driving based on interaction of multiple background traffic participants according to claim 6, wherein the Euclidean distance is calculated by the following expression:

$$d_{col}(j|i) = \min_{m \in \{1,2,\ldots,N_v\}} \sqrt{[x_{test}(j|i) - x_m(j|i)]^2 + [y_{test}(j|i) - y_m(j|i)]^2}$$

wherein ·(j|i) is a predicted value for a time step j+i at a current moment i, $d_{col}(j|i)$ is a Euclidean distance between the vehicle under test and a nearest background traffic participant, $N_v$ is a number of background traffic participants, $x_{test}(j|i)$ and $y_{test}(ji)$ are predicted values of coordinates of the vehicle under test, and $x_m(j|i)$ and $y_m(j|i)$ are predicted values of coordinates of the nearest background traffic participant m.

8. The intelligent testing method for autonomous driving based on interaction of multiple background traffic participants according to claim 6, wherein an expression of the model predictive control problem is:

$$\min_{a(\cdot|i)} J =$$

$$\sum_{m=1}^{N_v} \left[ J_{dis}^{(m)} + \sum_{j=0}^{N_p-1} \left( \omega_a a_m(j|i)^2 + \omega_c J_p^{(m)}(j+1|i) \right) \right] + \sum_{j=0}^{N_p-1} (\omega_{col} d_{col}(j+1|i))$$

$$J_{dis}^{(m)} := \frac{s_{m,max} - s_m(N_p|i)}{s_{m,max} - s_{c,m}}$$

s.t.

$$\begin{bmatrix} s_m(i+1) \\ v_m(i+1) \end{bmatrix} = \begin{bmatrix} 1 & \Delta t \\ 0 & 1 \end{bmatrix} \begin{bmatrix} s_m(i) \\ v_m(i) \end{bmatrix} + \begin{bmatrix} 0.5\Delta t^2 \\ \Delta t \end{bmatrix} a_m(i), \forall m \in I$$

$$\sum_{m=1,m\neq n}^{N_v} C_{mn}(j|i) = 0, \forall m \in I$$

$$[s_m(0,i), v_m(0|i)] = [s_{c,m}(i), v_{c,m}(i)], \forall m \in I$$

$$[x_m(j|i), y_m(j|i), \alpha_m(j|i)] = L(s_m(j|i)), \forall m \in I$$

$$a_{min} \leq a_m(j|i) \leq a_{max}, \forall m \in I$$

$$0 \leq v_m(j|i) \leq V_{max,look-up}^{(m)}(s_m(j|i)), \forall m \in I$$

wherein ·(j|i) is a predicted value for a time step j+i at a current moment i, $N_v$ is a number of background traffic participants, $N_p$ is a predicted level step, $\omega_a$ is an adjustment weight of a comfort term, $\alpha_m(j|i)$ is a predicted acceleration value of a background traffic participant m, $\omega_c$ is an adjustment weight of a safety guarantee term, $$J_p^{(m)}(j+1|i)$$

is a potential interaction constraint of a background traffic participant m at a moment j+1+i, $\omega_{col}$ is an adjustment weight of a conflict generation term, $d_{col}(j+1|i)$ is a Euclidean distance between the vehicle under test and a background traffic participant at a moment $$j+1+i, J_{dis}^{(m)}$$

is a performance indicator of timely and fast driving of a background traffic participant m under traffic rules, $s_{m,max}$ is a farthest distance of an $m^{th}$ background traffic participant, $s_m(N_p|i)$ is a position of an $m^{th}$ background traffic participant at a moment $N_p+i$, $S_{c,m}$ is an origin position wherein the background traffic participant stays, $I=\{1, 2, \ldots, N_v\}$ is a set of background traffic participants, $s_m(i)$, $v_m(i)$ and $\alpha_m(i)$ represent a position, a speed and an acceleration of an $m^{th}$ background traffic participant at a moment i, $\Delta t$ is a length of a predefined time interval, $C_{m,n}(j|i)$ is a predicted overlapping size of a collision area between a traffic interactor m and a traffic interactor n, $s_m(0|i)$ and $v_m(0|i)$ are initial state values of an $m^{th}$ background traffic participant in a predicted time domain, $S_{c,m}(i)$ and $v_{c,m}(i)$ are a position and a speed of the background traffic participant at the origin, $x_m(j|i)$ and $y_m(j|i)$ are predicted position values of a background traffic participant m, $\alpha_m(j|i)$ is a predicted heading angle value of a background traffic participant m, $L(s_m(j|i))$ is a geometric lookup table defined in a "position" space for a reference path of a background traffic participant m, wherein the position is represented by a distance $s_m(j|i)$ traveled along the reference path, $\alpha_{min}$ and $\alpha_{max}$ are a minimum acceleration value and a maximum acceleration value of a background traffic participant m at a moment j+i, and $$y^{(m)}_{max,look\text{-}up}$$

is a speed table or a background traffic participant m.

9. The intelligent testing method for autonomous driving based on interaction of multiple background traffic participants according to claim 1, wherein the reference speed is solved with a level-k reasoning method.

10. The intelligent testing method for autonomous driving based on interaction of multiple background traffic participants according to claim 1, wherein the multi-dimensional test performance evaluation indicators comprise a perception performance evaluation indicator, a decision performance evaluation indicator, a control performance evaluation indicator, an interaction performance evaluation indicator, an actual scenario simulation indicator, a system robustness evaluation indicator and a safety evaluation indicator.

* * * * *